Patented Mar. 28, 1950

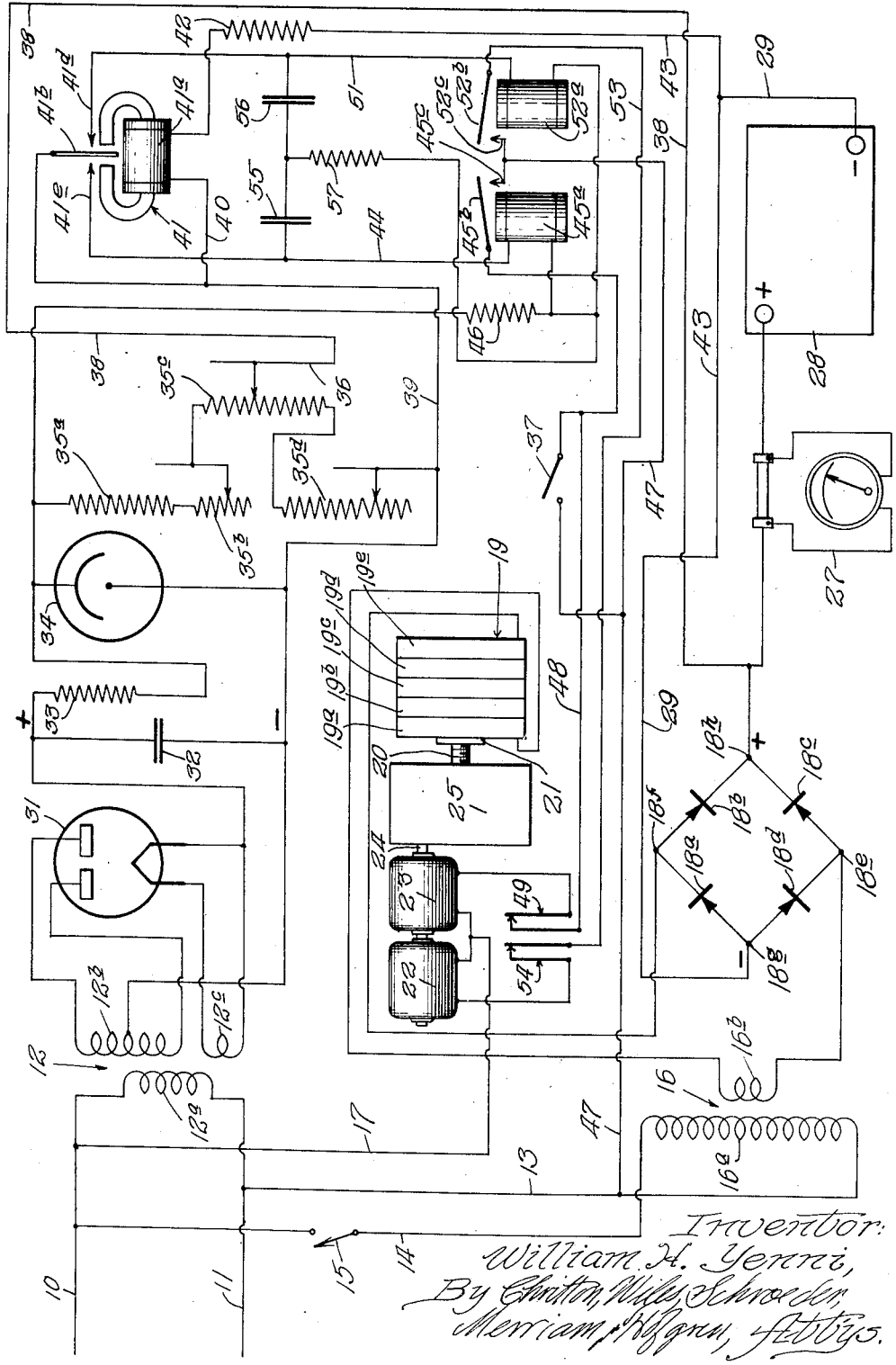

2,502,398

UNITED STATES PATENT OFFICE 2,502,398

BATTERY CHARGER

William H. Yenni, Neillsville, Wis., assignor to Joseph Weidenhoff, Inc., a corporation of Illinois Application September 26, 1945, Serial No. 618,629

11 Claims. (Cl. 320—39)

This invention relates to a battery charger, and particularly to apparatus designed for fast charging with substantially constant potential characteristics.

A principal feature of this invention is that it provides a fast charger adapted to operate on the constant potential, or slightly modified constant potential, principle of charging, where the current tapers off in accordance with the condition of the battery as it comes up to charge, wherein the potential at which it operates may be initially determined by the operator through a fairly wide choice of voltages. Where the charger is designed to handle 6 volt storage batteries, for example, the system is so arranged that the operator may set the potential desired at any value through a suitable range, as 6–8½ volts, and thereafter the apparatus will automatically maintain the voltage across the rectifier output constant at the selected voltage, as for example 7.4 volts, despite variations in the condition of the battery. With a battery which has been run down until it is substantially completely dead, although otherwise in good condition, setting the constant potential at 7.4 volts would result in starting charging at a rate of the order of 100 amperes, and the constant potential characteristics of the charger would cause this charging rate continually to taper. For example, at the end of half an hour under the conditions assumed the charging rate would have dropped to something in the order of 50 amperes; and at the end of a couple of hours the charging rate would have dropped to the order of 3 or 10 amperes.

A constant potential charging system will charge a battery fully in about four hours, and charge it to 90% or better within about 2½ hours, starting with a dead battery; and it will do this without unduly raising the battery temperature. A good battery will normally take a charge at this rate while its temperature remains around 115° F., and tests on a number of batteries failed to show any temperature rise above 125° F. Even partially sulphated batteries will take a charge in this manner, in the apparatus disclosed here, without undue heating.

The ability to set the constant potential automatically to be maintained by the charger is a very important improvement in battery charging apparatus. If the battery is to be left on the charger overnight, the voltage to be maintained across the rectifier output terminal can be set at 7 volts, for example, so that the battery charges rather slowly and will take nearly the overnight period to come up to full charge; or, as would more commonly be the case, the battery could be left overnight on a usual setting such as 7.4 volts, for example, whereupon the apparatus would prevent it from overheating even though it came up to full charge, or substantially so, in a time of the order of four hours. Under some conditions it may be desirable to charge a battery even more slowly, as for example if the battery is partially sulphated, and under these conditions the potential can be set down to even less than 7 volts. On the other hand, if the battery already has a half charge and it is desired to bring it up to practically full charge within a half hour, the potential can be set up to something of the order of 8 volts, or even higher.

Another feature of this invention is that it includes provision for nullifying the constant potential operation and causing the charge to be effected at a constant current. While normally not desirable, there may be emergencies or special conditions where it is desirable to charge a battery at a constant current of 100 amperes for half or three-quarters of an hour, and the charger here being disclosed is adapted to do this.

Other features and advantages of the invention will be apparent from the following specification and the drawing, which is a circuit diagram of an embodiment of my invention.

Referring now more particularly to the accompanying drawing, the system is adapted to be operated from a source of commercial current, as 110 volt, 60 cycle A. C., here indicated as being supplied through the wires 10 and 11. Power from this source is supplied to the primary 12a of a transformer 12 to actuate a pilot voltage system which will be more fully described hereafter; through the wires 13 and 14, when the switch 15 is closed, to the primary 16a of a step down transformer 16, this transformer energizing the rectifying arrangement supplying the direct current charging output; and through the wires 13 and 17 to power relays and motors used for control purposes, as will hereafter be more fully described.

Referring now more particularly to the system for supplying charging current, it will be seen that one end of the secondary 16b of the transformer is connected to one input corner (the lower as shown here) of a dry rectifier arrangement here indicated schematically as comprising the four segments 18a—d arranged appropriately in a diamond connection so that alternating current input to the corners 18e and 18f results in full wave rectification and direct current output from the corners 18g and 18h, these being negative and positive, respectively. While the one end of the secondary 16b is connected to the input terminal 18e of the rectifier, the other end of the secondary 16b is connected to the other terminal through a variable resistor 19 here indicated as comprising a stack of carbon washers 19a—e, connection from the other side of this stack being made to the other rectifier input terminal 18f. While this resistor 19 may be of any suitable variable type adapted to carry currents up to something of the order of 100 amperes, a stack of carbon washers, as indicated, is a particularly suitable type of resistor. In order to minimize the heating effect on the carbon, a machine actually being built in accordance with my inventions as disclosed here makes use of two similar carbon stacks in parallel, such not being indicated here because it was felt that they are fully equivalent to a single stack and because a showing of two stacks, with parallel connections, etc., would unduly complicate the drawing.

Variation of the resistance of the variable resistor 19 is effected by increasing or decreasing the compression force on the stack of carbon washers. This is here shown as accomplished by use of a threaded shaft 20 threaded into a nonrotatable but longitudinally movable plate 21, it being understood that the other end of the carbon pile is fixedly mounted. Rotation of the threaded shaft 20 in one direction, therefore, serves to increase the compression force on the carbon washers and to decrease the resistance provided thereby; and rotation of the shaft 20 in the opposite direction serves to lessen the compression and thus to increase the value of the variable resistor 19. In practice I have found that the use of spring metal metallic spacers between the carbon disks ensures equal distribution of the total pressure between the various contacting faces, improving stability of position and resistance variation characteristics. Rotation of the shaft 20 is effected through power means here shown as comprising two separate motors 22 and 23 connected to a single shaft 24, this shaft being the input shaft to a speed reducer 25 providing a very high rate of reduction on the drive between the shaft 24 and the threaded shaft 20. While any suitable reversible motor means may be used, I prefer to employ two separate motors, with one arranged to rotate the shaft 24 clockwise and the other counterclockwise, so that the direction of rotation, and thus the direction of variation of the value of the resistor 19, is determined by which of the motors 22 and 23 is energized.

The pulsating direct current output of the system 18 is taken off the output terminals 18g and 18h, positive charging current being delivered through the shunt of an ammeter here identified as 27 to the positive terminal of the storage battery 28, the circuit back to the rectifier being completed from the negative terminal of the battery, through the wire 29, to the rectifier output terminal 18g.

The principal features of my invention reside in the system for automatically varying the resistance of the carbon pile or other variable resistor to maintain a particular selected voltage across the output terminals of the rectifier during variations in load conditions resulting in variations in conditions in the battery as it takes on its charge; and in the means for enabling selection of the voltage to be maintained across the charger output terminals while still maintaining the automatic system simple and rugged, suitable for use in the average repair shop or gasoline station. These portions of my charger will now be described.

The secondary 12b of the transformer 12 is of the center-tapped variety, and its two outer terminals are connected to the anodes of a full wave rectifying tube 31, which may for example be of tube type No. 80. The cathode of this tube is heated by appropriate connections from a filament winding or secondary 12c, and the relation between the windings of the transformer 12 are preferably such as to provide a rectified output always in excess of 150 volts. This output is filtered by a condenser-resistor arrangement comprising the condenser 32, which may have a capacity of 8 microfarads and the resistor 33, which may be of 2500 ohms; and the voltage output of this filter section is held to 150 volts by a voltage regulating tube 34, which may for example be of tube type No. VR150. The stabilized output is then developed across a bleeder resistor arrangement comprising a fixed resistor 35a, a variable resistor 35b, another variable resistor or potentiometer 35c, and another variable resistance section 35d. The values of these resistors will depend upon the desired bleeder current, but I have found that very satisfactory and stable results are secured by use of 4,000 ohms for 35a, a maximum of 200 ohms for 35b, 250 ohms for 35c and a maximum of about 600 ohms for 35d, this resulting in a bleeder current in the neighborhood of 30 milliamperes. This system, despite possible wide variations in the supply source, enables a pilot voltage of the order of 6–8½ volts to be taken off the potentiometer lead 36 with a very high degree of accuracy, generally with less than .1% variation. The desired pilot voltage may be selected by movement of the movable contact of the potentiometer section 35c, so that this can be set at 7.0 volts, 7.4 volts or any other voltage in the range mentioned earlier.

The selected pilot voltage is then balanced, by means now to be described, against the output voltage of the dry disk rectifier; i. e., these voltages are compared. The relationship between the pilot voltage and the rectifier output voltage is then used, through functioning of a sensitive polarized relay and power relays, to actuate one or the other of the motors 22 and 23 in order to increase or decrease the value of the variable resistor 19. This increase or decrease is effected in such a manner as to bring the voltage across the dry disk rectifier into balance with the pilot voltage, so that the rectifier output voltage is always maintained constant at a value determined by the pilot voltage selected, the current delivered to the battery 28 varying in a manner necessary to maintain this constant potential under varying load conditions.

The positive pilot voltage output is impressed through the lead 38 to the positive output voltage of the dry disk rectifier 18, connection being made by said lead 38 to a point in the circuit leading from positive output terminal 18h of said rectifier. The negative pilot voltage is taken off from the bottom of the bleeder network through the lead 39, a lead 40 extending from the lead 39 to one side of the actuating coil 41a of the polarized relay 41. The other terminal of the actuating coil is connected through a current limiting resistor 42, which may have a value of 8,000 ohms, and through a lead 43 to the negative side of the dry disk rectifier. Current will thus flow through the actuating coil 41a of the polarized relay only when the pilot and rectifier output voltages are of different values; and then it will flow in a direction and quantity determined by the out-of-balance condition of the voltage relationship.

If the rectifier output voltage drops below the pilot voltage the actuating coil 41a is energized in a direction causing the movable contact member 41b to swing over into engagement with the fixed contact 41e, this setting up a current path from the negative side of the pilot voltage system through the wire 44 to one side of the actuating coil 45a of the power relay 45, the circuit being completed from the other side of this coil through the current limiting resistor 46 to the positive side of the bleeder resistance system. This causes the movable contact 45b, normally open, to swing into engagement with the fixed contact 45c, completing a power circuit from the A. C. wire 13, through the wire 47, the wire 48 and the limit switch 49 to the motor 23, the power circuit for this motor being completed through A. C. wire 17 which is common to both motors. This effects actuation of the motor 23 in a direction tightening the carbon disks of the variable resistance 19 and increasing the current output across the dry disk rectifier, the output voltage of this rectifier thus rising until it reaches a balance with the pilot voltage. As soon as this happens the movable element 41b of the polarized relay swings to mid position (there no longer being any actuating current through the coil 41a) and the power circuit for the motor 23 is opened.

On the other hand, as the battery condition changes in such manner that the voltage across the rectifier tends to exceed the pilot voltage, as happens continually as the battery takes on its charge, the out-of-balance condition causes a current to flow through the coil 41a of the polarized relay in the other direction, causing the movable contact 41b to swing into engagement with the fixed contact 41d. This completes a relay actuating circuit through the wire 51, the coil 52a of the power relay 52, and the resistor 46 back to the positive end of the bleeder resistance system. This energizes the relay 52 and causes the normally opened contacts 52b and 52c to close, completing a motor circuit from the common A. C. wire 47 through the wire 53 and the limit switch 54 to the motor 22, the power circuit again being completed through common A. C. wire 17. This energizes the motor 22 and causes it to rotate in a direction tending to separate the carbon disks of the variable resistor 19 and increase its resistance, thus lowering the current output of the dry disk rectifier. This action continues until the output voltage again balances the pilot voltage and the polarized relay 41 opens, causing cessation of operation of the motor 22.

Any tendency of the system to "hunt" is obviated by the system comprising the condensers 55 and 56 and the resistor 57. The condensers, for example, may have capacities of 1 microfarad; and a value of 200 ohms has proved very satisfactory for the resistor 57. This network tends to stabilize the operation of the polarized relay 41 and the power relays 45 and 52 actuated thereby, and yet retains sufficient sensitivity such that a differential in voltage relationship in the order of only one or two hundredths of a volt between the pilot voltage and the rectifier output voltage will cause operation of the system. The limit switches 49 and 54 are in practice mechanically associated with the axial movement of the carbon disks in such manner that maximum and minimum currents are defined, as for example 100 amperes maximum and 7 or 8 amperes minimum. If the carbon disks are compressed to a point where the rectifier will put out the predetermined desired maximum current, as 100 amperes, any further actuation of the motor 23 immediately stops itself by opening of the limit switch 49; and similarly, spreading of the carbon disks to the point where the desired minimum current is reached causes opening of the limit switch 54 preventing any further increase in the value of the variable resistor 19.

Whether the system thus described operates as a true constant potential system or as a modified constant potential system is determined by the amount of resistance between the rectifier output and the battery 28. If heavy cables are used the output curve will follow a true constant potential curve; whereas if relatively small wires are used to introduce appreciable resistance between the rectifier output and the battery (as for example five feet of No. 10 wire), the charging curve will follow a slightly modified form of constant potential curve, being somewhat above the true constant potential curve toward the end of the charging period. If it is desired to use the charger here disclosed as a very fast charger, with no tapering action, the switch 37 may be thrown to its closed position. This shorts across the contacts 45b and 45c and causes the motor 23 to operate until the limit switch 49 is opened, ensuring continuing operation at the predetermined maximum current, as 100 amperes.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described for charging a battery, including: a first circuit providing a source of direct current of a voltage of the same general order as that of the battery to be charged; a variable control element for determining the output voltage of said source; motor means for varying said control element; a pilot voltage source; a second circuit connecting said pilot voltage with said first circuit for obtaining a comparison between said output voltage and said pilot voltage; and a control device operated by amplitude differences between said output voltage and said control voltage for actuating said motor means as a function of the relationship between said voltages.

2. Apparatus of the character described for charging a battery, including: a first circuit providing a source of direct current of a voltage of the same general order as that of the battery to be charged; a variable control element in said circuit for determining the output voltage of said source; motor means for varying said control element; a pilot voltage source adapted to provide any selected pilot voltage in a predetermined range; a second circuit connecting said selected pilot voltage with said first circuit for obtaining a comparison between said output voltage and said pilot voltage; and a control device having a portion in said second circuit operated by amplitude differences between said output voltage and said control voltage for actuating said motor means as a function of the amplitude relationship between said voltages.

3. Apparatus of the character described for charging a battery, including: a source of direct current of a voltage of the same general order as that of the battery to be charged; a variable control element for determining the output voltage of said source; motor means for varying said control element; a pilot voltage source; and means, including a polarized relay, for comparing said output voltage and said pilot voltage and actuating said motor means as a function of the relationship between said voltages.

4. Apparatus of the character described for charging a battery, including: a source of direct current of a voltage of the same general order as that of the battery to be charged; a variable control element for determining the output voltage of said source; motor means for varying said control element; a pilot voltage source; and means, including a polarized relay, for comparing said output voltage and said pilot voltage and actuating said motor means as a function of the relationship between said voltages to maintain said output voltage equal to said pilot voltage despite variations in the load as a result of variations in the condition of the battery being charged.

5. Apparatus of the character described for charging a battery, including: a source of direct current of a voltage of the same general order as that of the battery to be charged; a variable control element for determining the output voltage of said source; motor means for varying said control element; a pilot voltage source adapted to provide any selected pilot voltage in a predetermined range, this means including a predetermined voltage source and a manually variable potentiometer; and means, including a polarized relay, for comparing said output voltage and said pilot voltage and actuating said motor means as a function of the relationship between said voltages to maintain said output voltage equal to said pilot voltage despite variations in the load as a result of variations in the condition of the battery being charged.

6. Apparatus of the character described for charging a battery, including: a source of direct current of a voltage of the same general order as that of the battery to be charged, including a rectifier; a variable control element for determining the output voltage of said source, comprising a variable resistor, both the rectifier and resistor being capable of handling heavy currents; motor means for varying said control element; a pilot voltage source; and means, including a polarized relay, for comparing said output voltage and said pilot voltage and actuating said motor means as a function of the relationship between said voltages to maintain said output voltage equal to said pilot voltage despite variations in the load as a result of variations in the condition of the battery being charged.

7. Apparatus of the character described for charging a battery, including: a source of direct current of a voltage of the same general order as that of the battery to be charged, including a rectifier; a variable control element for determining the output voltage of said source, comprising a variable resistor, both the rectifier and resistor being capable of handling heavy currents; motor means for varying said control element; a pilot voltage source adapted to provide any selected pilot voltage in a predetermined range, this means including a predetermined voltage source and a bleeder resistor, at least a portion of this resistor comprising a manually variable potentiometer; and means, including a polarized relay, for comparing said output voltage and said pilot voltage and actuating said motor means as a function of the relationship between said voltages to maintain said output voltage equal to said pilot voltage despite variations in the load as a result of variations in the condition of the battery being charged.

8. Apparatus of the character described for charging a battery, including: a source of direct current of a voltage of the same general order as that of the battery to be charged; a variable control element for determining the output voltage of said source; motor means for varying said control element; a pilot voltage source; means for comparing said output voltage and said pilot voltage and actuating said motor means as a function of the relationship between said voltages; and means for limiting the output current regardless of said relationship.

9. Apparatus of the character described for charging a battery, including: a source of direct current of a voltage of the same general order as that of the battery to be charged, including a rectifier; a variable control element for determining the output voltage of said source, comprising a variable resistor, both the rectifier and resistor being capable of handling heavy currents; motor means for varying said control element; a pilot voltage source adapted to provide any selected pilot voltage in a predetermined range, this means including a predetermined voltage source and a bleeder resistor, at least a portion of this resistor comprising a manually variable potentiometer; means, including a polarized relay, for comparing said output voltage and said pilot voltage and actuating said motor means as a function of the relationship between said voltages; and means for limiting the output current regardless of said relationship.

10. Apparatus of the character claimed in claim 6, wherein said variable resistor is in the input circuit to said rectifier.

11. Apparatus of the character claimed in claim 9, wherein said variable resistor is in the input circuit to said rectifier and is of the carbon pile type, the motor means being so arranged as to vary the compression of said pile.

WILLIAM H. YENNI.

REFERENCES CITED

The following references are of record in the file of this patent:

UNITED STATES PATENTS

| Number | Name | Date |
|---|---|---|
| 747,686 | Creveling | Dec. 22, 1903 |
| 1,227,771 | Foote | May 29, 1917 |
| 1,802,483 | Siragusa | Apr. 28, 1931 |
| 1,805,140 | Graybill | May 12, 1931 |
| 1,852,799 | Cheeseman | Apr. 5, 1932 |
| 2,066,603 | Beetem | June 5, 1937 |
| 2,069,737 | Beetem | Feb. 9, 1937 |
| 2,158,979 | Briesch | May 6, 1939 |
| 2,258,607 | Grabau | Oct. 14, 1941 |
| 2,270,394 | Overbeck | Jan. 27, 1942 |
| 2,306,998 | Claesson | Dec. 29, 1942 |
| 2,322,955 | Perkins | June 29, 1943 |
| 2,334,528 | Amsden | Nov. 16, 1943 |
| 2,346,997 | Priest | Apr. 18, 1944 |